United States Patent
Ohkawa

(10) Patent No.: US 6,795,932 B2
(45) Date of Patent: Sep. 21, 2004

(54) CLOCK SWITCHOVER CIRCUIT

(75) Inventor: Tsuyoshi Ohkawa, Hyogo (JP)

(73) Assignees: Renesas Technology Corp., Tokyo (JP); Mitsubishi Electric System LSI Design Corporation, Hyogo (JP)

( * ) Notice: Subject to any disclaimer, the term of this patent is extended or adjusted under 35 U.S.C. 154(b) by 554 days.

(21) Appl. No.: 09/853,777

(22) Filed: May 14, 2001

(65) Prior Publication Data

US 2002/0075042 A1 Jun. 20, 2002

(30) Foreign Application Priority Data

Dec. 15, 2000 (JP) ........................................ 2000-381971

(51) Int. Cl.[7] .............................. G06F 1/04; H04L 7/00
(52) U.S. Cl. ......................... 713/600; 713/503; 375/271
(58) Field of Search .................................. 713/600, 500, 713/501, 503, 400; 375/371, 355

(56) References Cited

U.S. PATENT DOCUMENTS

| | | | |
|---|---|---|---|
| 4,870,299 A | * | 9/1989 | Chen ........................... 327/99 |
| 5,155,380 A | * | 10/1992 | Hwang et al. ................. 327/99 |
| 5,274,678 A | * | 12/1993 | Ferolito et al. ............. 375/357 |
| 5,623,223 A | * | 4/1997 | Pasqualini ................... 327/298 |
| 5,652,536 A | * | 7/1997 | Nookala et al. ............. 327/298 |

FOREIGN PATENT DOCUMENTS

| | | | |
|---|---|---|---|
| JP | 60-251418 | 12/1985 | |
| JP | 63000726 A | * 1/1988 | ............. G06F/5/06 |
| JP | 5-100766 | 4/1993 | |

OTHER PUBLICATIONS

Rosing et al, Clock Switching: a New Design for current Testability (DcT) Method for Dynamic Logic Circuits, IEEE, Nov. 1998, p. 6.*

* cited by examiner

Primary Examiner—Thomas Lee
Assistant Examiner—Suresh K Suryawanshi
(74) Attorney, Agent, or Firm—Leydig, Voit & Mayer, Ltd.

(57) ABSTRACT

A clock switchover circuit includes a NAND circuit supplied with an output of a first inverter circuit, and a first flip-flop (DFF) supplied with an output of the NAND circuit. Further, the circuit includes a NOR circuit, and a second DFF supplied with an output of the NOR circuit. A second inverter circuit is supplied with an output of the first DFF. A clock signal selection section is supplied with outputs of the second DFF and the second inverter circuit. A third inverter circuit is supplied with an output of the clock signal selection section and produces a clock signal.

5 Claims, 5 Drawing Sheets

CLOCK SWITCHOVER CIRCUIT

FIELD OF THE INVENTION

The present invention in general relates to a clock switchover circuit. In particular, this invention relates to a clock switchover circuit for switching a signal level of, for example, as a CPU of a microcomputer.

BACKGROUND OF THE INVENTION

A conventional clock switchover circuit is shown in FIG. 4. This clock switchover circuit is disclosed in the Japanese Patent Application Laid-Open (JP-A) No. 5-100766. The conventional clock switchover circuit 100 includes a clock signal selection section having 3-input AND circuits 210 and 220 and an OR circuit 230.

The clock switchover circuit 100 also includes D flip-flops ("DFF") 140 and 150. Signals output from the DFF 140 and 150 and a clock signal clkY are input into the AND circuit 210. The clock switchover circuit 100 further includes DFF 190 and 200. Signals output from the DFF 190 and 200 and a clock signal clkX are input into the AND circuit 220.

The clock switchover circuit 100 further includes AND circuits 110 and 160. The AND circuit 110 is supplied with a selection signal selX. A signal output from this AND circuit 110 is supplied to the DFF 140. The AND circuit 160 is also supplied with the selection signal selX. A signal output from this AND circuit 160 is supplied to the DFF 190.

The conventional clock switchover circuit 100 functions as explained below. FIG. 5 is a time chart of the clock switchover circuit 100. As shown in FIG. 5, the clock signal clkY is selected as an output signal OUT before time t0.

At the time t0, the selection signal selX is changed from "L" (a low logical level) to "H" (a high logical level) At time t1, output states of the DFF 140, 150, 190 and 200 become "L", "L", "L" and "H", respectively, and the clock signal clkY disappears from the output signal OUT.

At time t2, the output states of the DFF 140, 150, 190 and 200 become "L", "L", "L" and "L", respectively, and the clock signal clkY does not appear as the output signal OUT.

At time t3, the output states of the DFF 140, 150, 190 and 200 become "H", "L", "L" and "L", respectively, and the clock signal clkY does not appear as the output signal OUT.

At time t4, the output states of the DFF 140, 150, 190 and 200 become "H", "H", "L" and "L", respectively, and the clock signal clkY does not appear as the output signal OUT.

Thus, switchover of the clock signal clkY to clkX occurs by output cessation of the clock signal clkY at the time t1, generation of a blank interval corresponding to one clock of the clock signal clkY in a time interval between the time t1 and t2, generation of a blank interval corresponding to one clock of the newly selected clock signal clkX in a time interval between the time t3 and t4, and output of the clock signal clkX at the time t4.

In the conventional clock switchover circuit, therefore, it is necessary to generate many blank intervals in order to prevent glitches caused by collision of switched clock signals. These intervals are a hindrance to fast access.

In addition, since the clock signal selection section includes 3-input gates, the signal transfer efficiency degrades.

In addition, hazards are apt to be caused by dispersion of floating delays. Thus, there is a problem that a racing phenomenon may occur between DFFs.

SUMMARY OF THE INVENTION

The clock switchover circuit according to one aspect of this invention comprises a first inverter circuit which is supplied with a clock switchover signal, and a NAND circuit which is supplied with an output of the first inverter circuit. Further, there is provided a first flip-flop which is supplied with an output of the NAND circuit at a data input terminal thereof, supplied with a first clock input signal at a clock input terminal thereof, and supplied with a system reset signal at a reset terminal thereof. Further, there is provided a NOR circuit which is supplied with the output of the first inverter circuit. Further, there is provided a second flip-flop which is supplied with an output of the NOR circuit at a data input terminal thereof, supplied with a second clock input signal at a clock input terminal thereof, and the system reset signal at a reset terminal thereof. Further, there is provided a second inverter circuit which is supplied with an output of an output inversion signal terminal of the first flip-flop. Further, there is provided a clock signal selection section which is supplied with an output of the second inverter circuit, the first clock input signal, an output of an output inversion signal terminal of the second flip-flop, and the second clock input signal. Further, there is provided a third inverter circuit, which is supplied with a signal output signal from the clock signal selection section, and which outputs a clock signal.

The clock switchover circuit according to another aspect of this invention comprises a first switch for conducting switchover to select a power supply potential terminal or a ground potential terminal according to the level of the clock switchover signal. Further, there is provided a second switch for conducting switchover to select a first clock input signal terminal or a second clock input signal terminal according to a level of a clock switchover signal. Further, there is provided a shift register which is supplied with a potential selected by the first switch at a data input terminal thereof, supplied with a clock input signal selected by the second switch at a clock input terminal thereof, and supplied with a system reset signal at a reset terminal thereof, the shift register outputting a shifted level from a data output terminal thereof. Further, there is provided a switchover section supplied with a signal output from the shift register, the first clock input signal, the second clock input signal, and the system reset signal.

Other objects and features of this invention will become apparent from the following description with reference to the accompanying drawings.

DESCRIPTION OF THE PREFERRED EMBODIMENTS

Preferred embodiments of the clock switchover circuit according to this invention are explained below with reference to the accompanying drawings.

Figure 1:
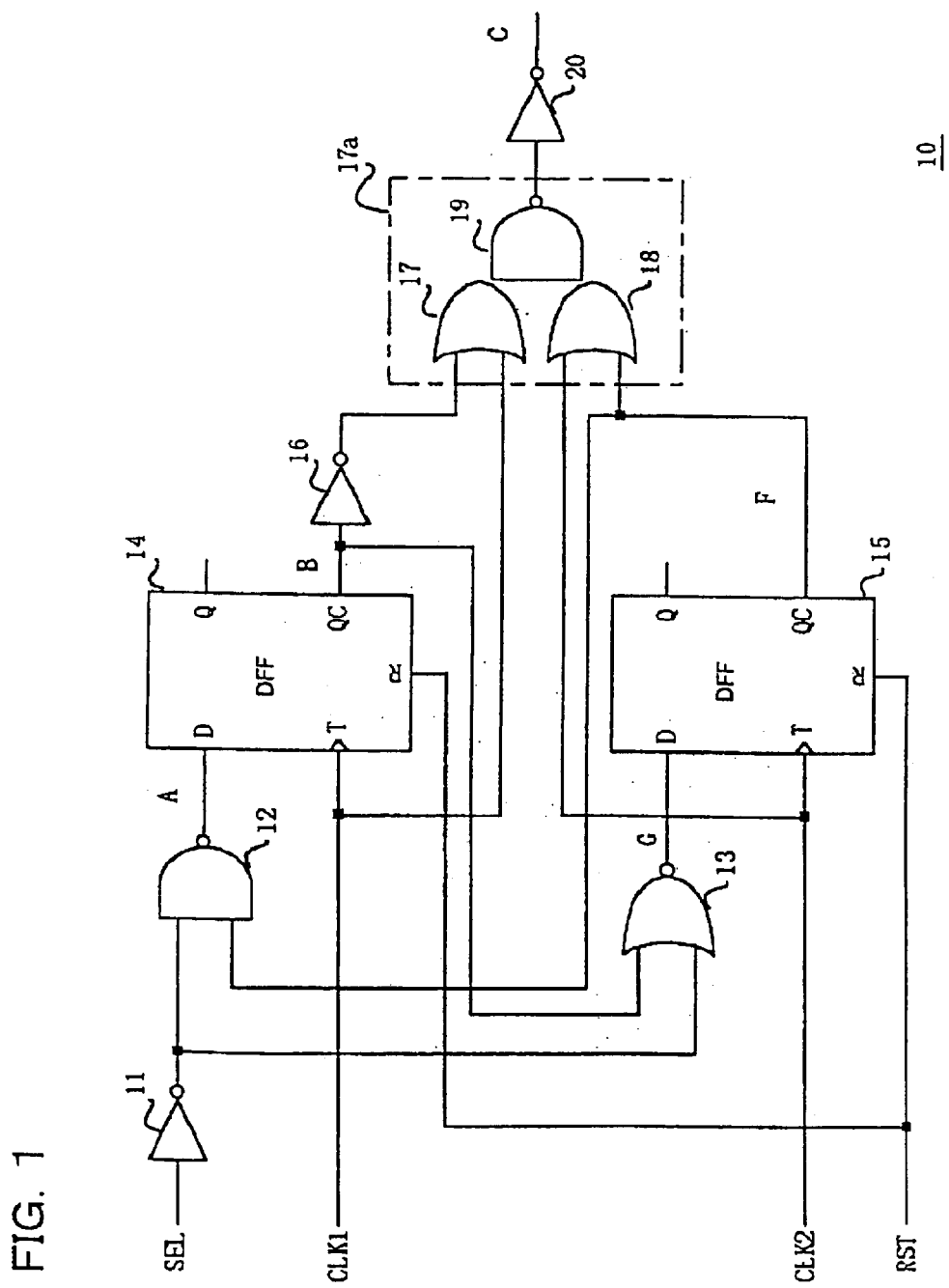
FIG. 1 is a circuit diagram of a clock switchover circuit according to a first embodiment of the present invention.

A circuit diagram of the clock switchover circuit according to the first embodiment is shown in FIG. 1. The clock switchover circuit 10 according to the first embodiment includes an inverter circuit 11 which is supplied with a clock switchover signal SEL.

The clock switchover circuit 10 further includes a NAND circuit 12 to which the output of the inverter circuit 11 is supplied. A DFF 14 having a data input terminal D, a clock input terminal T, a reset terminal R, a Q terminal, and a QC terminal is provided. Signal A output from the NAND circuit 12 is supplied to the data input terminal D of the DFF 14, a clock input signal CLK1 is supplied to the clock input terminal T of the DFF 14, and a system reset signal RST is supplied to the reset terminal R of the DFF 14.

The clock switchover circuit 10 further includes a NOR circuit 13 which is supplied with the signal output from the inverter circuit 11. A DFF 15 having a data input terminal D, a clock input terminal T, a reset terminal R, a Q terminal, and a QC terminal is provided. Signal G output from the NOR circuit 13 is supplied to the data input terminal D of the DFF 15, a clock input signal CLK2 is supplied to the clock input terminal T of the DFF 15, and the system reset signal RST is supplied to the reset terminal R of the DFF 15.

Furthermore, the NAND circuit 12 is supplied with a signal F output from the QC terminal of the DFF 15. This signal F is an inverted signal of a signal output from the terminal Q of the DFF 15. Similarly, the NOR circuit 13 is supplied with a signal B output from the QC terminal of the DFF 14. This signal B is an inverted signal of a signal output from the terminal Q of the DFF 14.

The clock switchover circuit 10 further includes an inverter circuit 16 supplied with the signal B output from the QC terminal of the DFF 14. Further, there is provided an OR circuit 17 which is supplied with a signal output from the inverter circuit 16 and the clock input signal CLK1. Further, there is provided an OR circuit 18 which is supplied with the signal F output from the QC terminal of the DFF 15 and the clock input signal CLK2.

The clock switchover circuit 10 further includes a NAND circuit 19 which is supplied with signals outputs from the OR circuits 17 and 18. The NAND circuit 19 and the OR circuits 17 and 18 form a clock signal selection 17a.

The clock switchover circuit 10 further includes an inverter circuit 20 which is supplied with a signal output from the clock signal selection section 17a (i.e. the NAND circuit 19). This inverter circuit 20 outputs a signal C which is the output clock.

Figure 2:
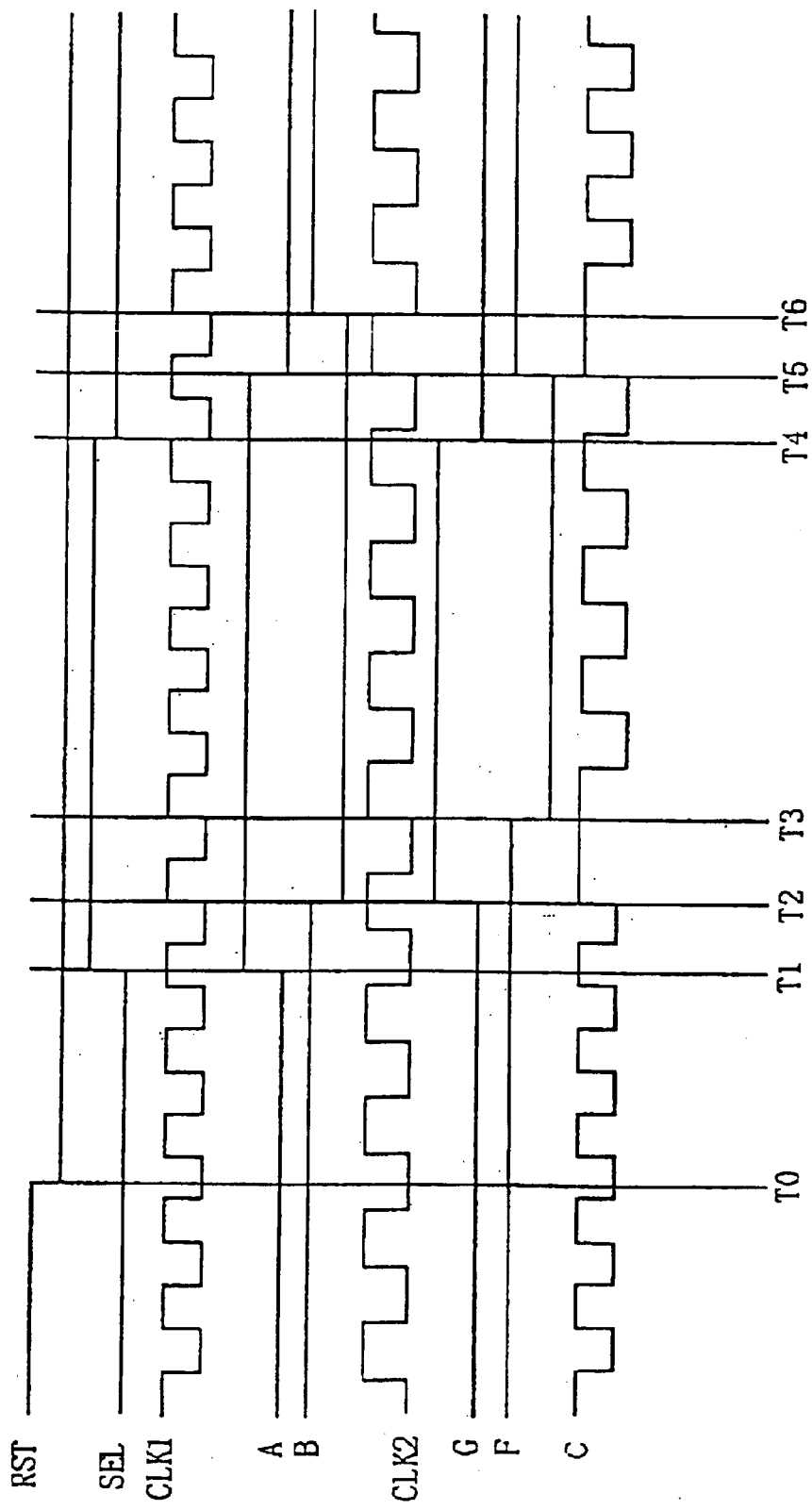
FIG. 2 is a time chart of the clock switchover circuit according to the first embodiment.

The clock switchover circuit 10 functions as follows. FIG. 2 is a time chart of the clock switchover circuit 10. The reference characters RST, SEL, CLK1 etc. in the left of this figure are the different signals mentioned in the FIG. 1.

The switchover signal SEL and system reset signal RST are asynchronous signals.

The system reset signal RST is "H" until time T0. Irrespective of the level of switchover signal SEL and values latched in the DFF 14 and 15, levels of signals B and F change to "H".

If the levels of signals B and F change to "H", then clock input signal CLK2 is masked and C similar to clock input signal CLK1 is outputted.

If the level of switchover signal SEL changes to "H" at time of T1, the level of signal A changes to "H".

After the level of signal A has changed to "H" and until time T2 when clock input signal CLK1 rises, the level of signal B remains "H" and the level of signal G remains "L" and a signal C which is the same as the clock input signal CLK1 is output.

If the level of signal B changes to "L" at time T2, then clock input signal CLK1 is masked and the level changes to "H".

After the level of signal G has changed to "H" and until time T3 when the clock input signal CLK2 rises, the level of signal F remains "H" and the clock input signal CLK2 is masked.

During an interval between time T2 and time T3, clock input signals CLK1 and CLK2 are masked and the level of signal C becomes "H".

If the level of signal F changes to "L" at the time T3, then a signal C which is the same as the clock input signal CLK2 is output.

If the level of switchover signal SEL changes to "L" at time T4, then the level of signal G changes to "L".

After the level of signal G has changed to "L" and until time T5 when the clock input signal CLK2 rises, the level of signal F remains "L" and the level of signal A remains "H". As a result, a signal C which is the same as the clock input signal CLK2 is output.

If the level of signal F changes to "H" at time T5, then the clock input signal CLK2 is masked. If the level of the signal F changes to "H", then the level of the signal A changes to "L".

After the level of the signal A has changed to "L" and until time T6 when the clock input signal CLK1 rises, the level of the signal B remains "L" and the signal C is masked.

During an interval between time T5 and time T6, the clock input signals CLK1 and CLK2 are masked and the level of the signal C becomes "H".

If the level of the signal B changes to "H" at the time T6, then a signal C which is the same as the clock input signal CLK1 is output.

It is explained above that the above described clock switchover circuit 10 is supplied with two clocks. However, there is no limitation to the number of clocks until the number is greater than one.

Furthermore, the DFFs are used as means for synchronizing. However, other types of flip-flops which conducts an operation which is similar to the operation of the DFF may be used.

Furthermore, the operation is activated at a point of time when the signal(s) rises. However, arrangement may be made such that the operation is activated at a point of time when the signal(s) falls.

If it is assured that switchover signal SEL becomes a decided level, then the circuit may be formed without using system reset signal RST.

The clock switchover circuit 10 may be set inside a semiconductor apparatus or it may be set outside a semiconductor apparatus.

According to the first embodiment, the number of required DFFs can be decreased in comparison to the conventional circuit. As a result, the circuit scale can be made relatively smaller.

Furthermore, since only 2-input gates are used, the signal transfer efficiency is high. The switchover signal SEL is input into the gates located before both DFFs by one inverter circuit. Even if the intensity of switchover signal SEL supplied to the clock switchover circuit is weak, therefore, switchover signal SEL is supplied to both DFFs with the same level. As a result, a time shift is not apt to occur.

In addition, the efficiency of the layout area can be increased by using the NAND circuit.

Figure 3:
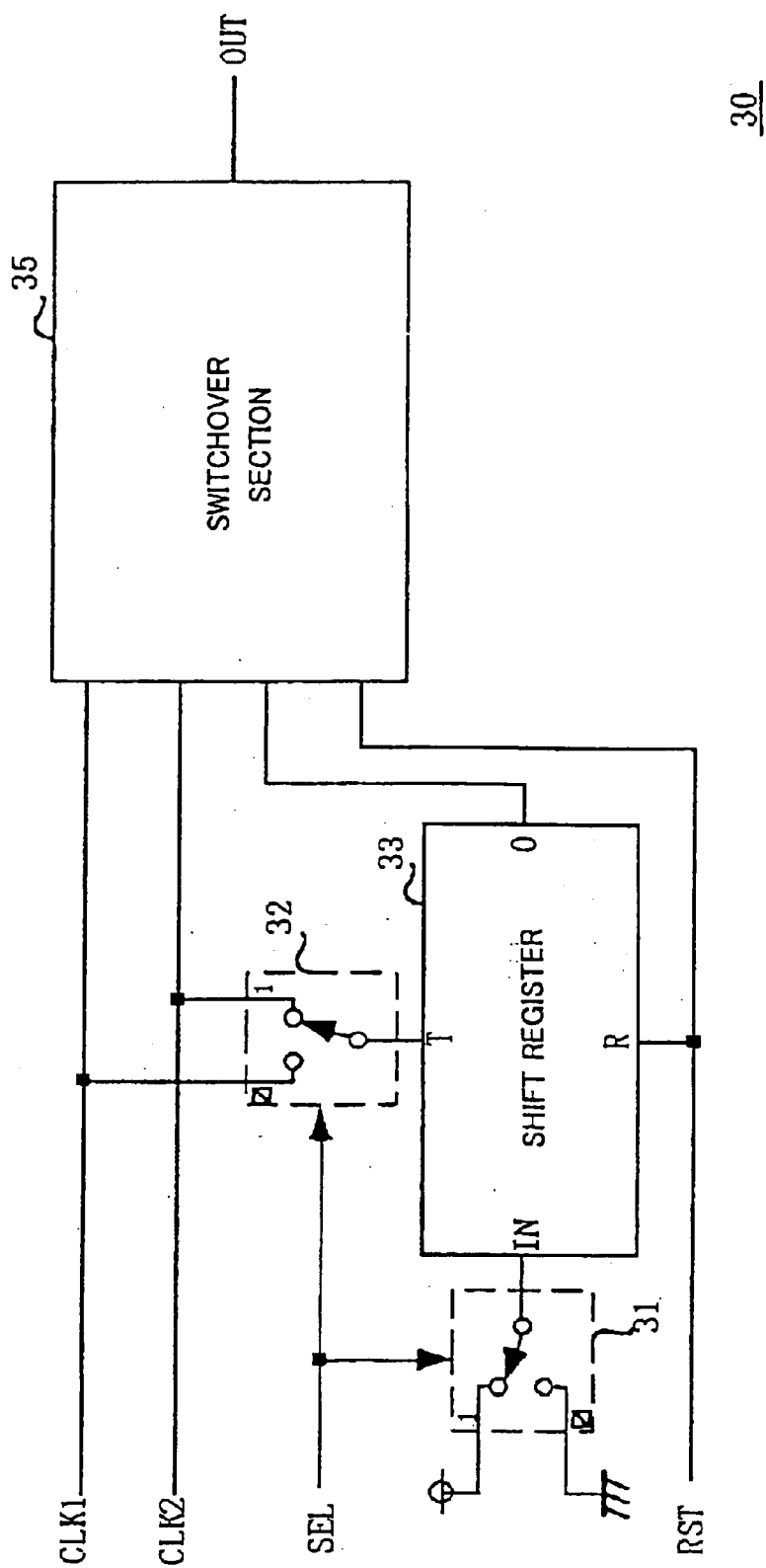
FIG. 3 is a circuit diagram of a clock switchover circuit according to a second embodiment.
Figure 4:
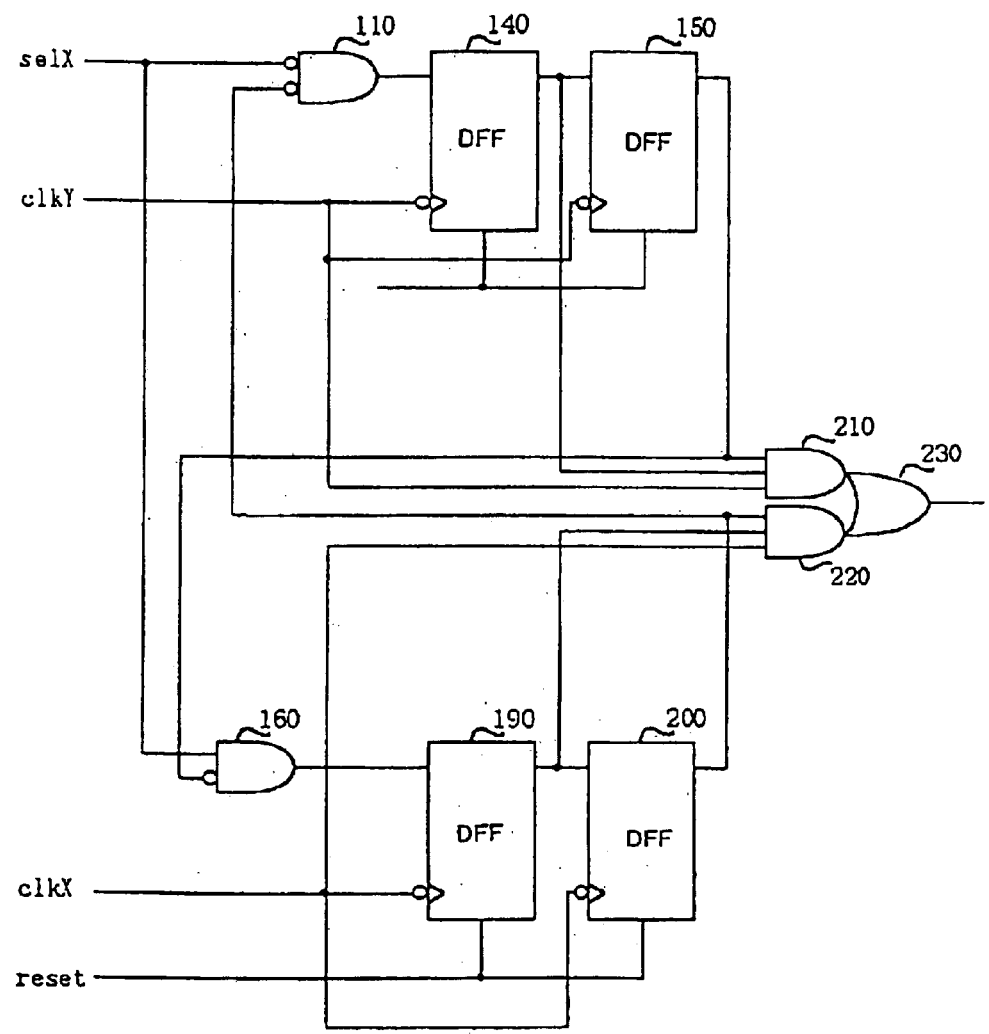
FIG. 4 is a circuit diagram of a conventional clock switchover circuit.
Figure 5:
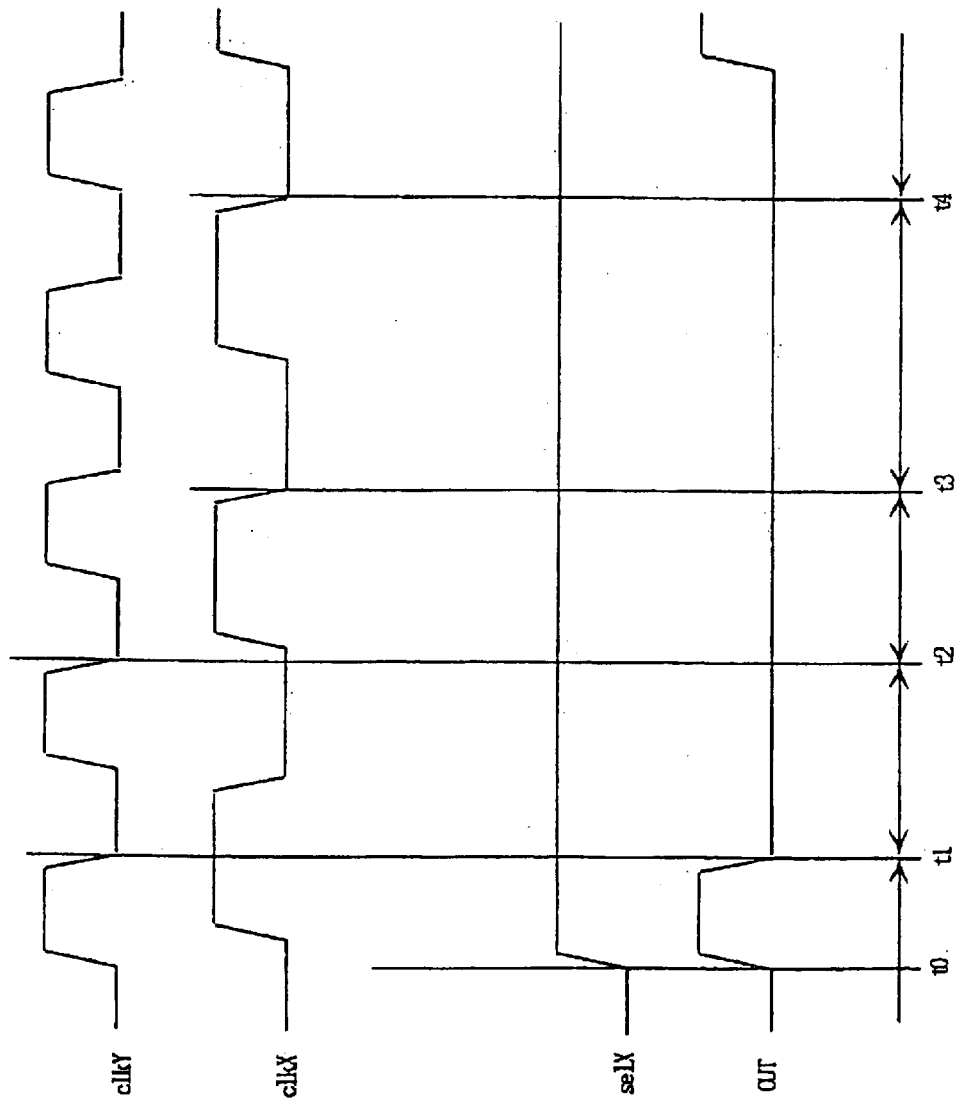
FIG. 5 is a time chart of a conventional clock switchover circuit.

A circuit diagram of the clock switchover circuit according to a second embodiment is shown in FIG. 3. The clock switchover circuit 30 according to a second embodiment includes switches 31 and 32 which operate based on the level of a switchover signal SEL.

The clock switchover circuit 30 further includes a shift register 33 which is supplied with a level output from the switch 31 at a data input terminal IN thereof, supplied with a signal output from the switch 32 at a clock input terminal T thereof, and supplied with a system reset signal RST at a R terminal thereof. The shift register 33 outputs a shifted level from a data output terminal 0.

The clock switchover circuit 30 further includes a switchover section 35. The switchover section 35 is supplied with a signal output from the shift register 33, the clock input signals CLK1 and CLK2, and the system reset signal RST.

The operation of this clock switchover circuit 30 is enabled when the system reset signal RST is "H". The switchover signal SEL is forcibly changed to "L" and the shift register 33 outputs the level of "L".

The clock switchover circuit 30 forcibly outputs a signal OUT which is the same as the clock input signal CLK1.

The switchover signal SEL and the system reset signal RST are asynchronous signals. The level of the switchover signal SEL is determined based on the system reset signal RST.

When the level of switchover signal SEL is "L", the switch 31 selects ground terminal. As a result, "L" level is input into the shift register 33. Furthermore, the switch 32 outputs the clock input signal CLK1. As a result, the clock input signal CLK1 is input into the shift register 33.

Immediately after the level of system reset signal RST is changed from "H" to "L", the level of switchover signal SEL remains "L" and the shift register 33 starts level shift of "L" by using clock input signal CLK1 as a clock source.

The output of the shift register 33 remains the level of "L", and the clock switchover circuit 30 outputs OUT similar to clock input signal CLK1.

When the level of switchover signal SEL has changed to "H", the switch 31 outputs a voltage Vdd (higher than the voltage at the ground terminal). Furthermore, the switch 32 selects clock input signal CLK2. As a result, the shift register 33 shifts the level of "H" by using clock input signal CLK2 as the clock source.

When N bits have been shifted, the shift register 33 outputs the level of "H" from the data output terminal 0.

As a result, the clock switchover circuit 30 outputs a signal OUT which is same as the clock input signal CLK2.

When the level of switchover signal SEL has changed to "L", the switch 31 is switched to ground terminal. Furthermore, the switch 32 outputs the clock input signal CLK1. As a result, the shift register 33 shifts the level of "L" by using clock input signal CLK1 as the clock source.

When N bits have been shifted, the shift register 33 outputs the level of "L" from the data output terminal 0.

As a result, the clock switchover circuit 30 outputs a signal OUT which is same as the clock input signal CLK1.

It is explained above that the above described clock switchover circuit 30 is supplied with two clocks. However, there is no limitation to the number of clocks until the number is greater than one.

By applying frequency division to the clock source of the shift register 33, the circuit scale can be made small.

By deriving exclusive OR of the input and output of the shift register 33, a resultant signal can be used as a signal for determining whether clock switchover has been conducted.

Also, the shift register is used as a means for counting. However, any other circuit which operates in the same manner as the shift register may be used.

The clock switchover circuit 30 may be set inside a semiconductor apparatus or it may be set outside a semiconductor apparatus.

In the second embodiment, clock switchover is not carried out when the clock to which switchover should be conducted is in a halt state. Therefore, a system halt can be prevented.

In other words, it is possible to implement such a clock switchover circuit that switchover switchover is not carried out when the clock to which switchover should be conducted is in an unstable oscillation state.

In addition, since switchover signal SEL passes through the shift register, switchover signal SEL becomes immune to noise.

The clock switchover circuit according to one aspect of this invention comprises a first inverter circuit which is supplied with a clock switchover signal, and a NAND circuit which is supplied with an output of the first inverter circuit. Further, there is provided a first flip-flop which is supplied with an output of the NAND circuit at a data input terminal thereof, supplied with a first clock input signal at a clock input terminal thereof, and supplied with a system reset signal at a reset terminal thereof. Further, there is provided a NOR circuit which is supplied with the output of the first inverter circuit. Further, there is provided a second flip-flop which is supplied with an output of the NOR circuit at a data input terminal thereof, supplied with a second clock input signal at a clock input terminal thereof, and the system reset signal at a reset terminal thereof. Further, there is provided a second inverter circuit which is supplied with an output of an output inversion signal terminal of the first flip-flop. Further, there is provided a clock signal selection section which is supplied with an output of the second inverter circuit, the first clock input signal, an output of an output inversion signal terminal of the second flip-flop, and the second clock input signal. Further, there is provided a third inverter circuit, which is supplied with a signal output signal from the clock signal selection section, and which outputs a clock signal.

According to the above-mentioned aspect, it is possible to reduce the number of flip-flops and thereby reduce the circuit scale. Furthermore, since only 2-input gates are used, the signal transfer efficiency is high. In addition, the switchover signal SEL is input into the gates located before both DFFs by one inverter circuit, hence, even if the intensity of switchover signal SEL supplied to the clock switchover circuit is weak, the switchover signal SEL is supplied to both DFFs with the same level. As a result, a time shift is not apt to occur. Also, the efficiency of the layout area can be increased by using the NAND circuit.

The clock switchover circuit according to another aspect of this invention comprises a first switch for conducting switchover to select a power supply potential terminal or a ground potential terminal according to the level of the clock switchover signal. Further, there is provided a second switch for conducting switchover to select a first clock input signal terminal or a second clock input signal terminal according to a level of a clock switchover signal. Further, there is provided a shift register which is supplied with a potential selected by the first switch at a data input terminal thereof, supplied with a clock input signal selected by the second switch at a clock input terminal thereof, and supplied with a system reset signal at a reset terminal thereof, the shift register outputting a shifted level from a data output terminal thereof. Further, there is provided a switchover section supplied with a signal output from the shift register, the first clock input signal, the second clock input signal, and the system reset signal.

According to the above-mentioned aspect, clock switchover is not carried out when the clock to which switchover should be conducted is in a halt state. Therefore, a system halt can be prevented. It is possible to implement such a clock switchover circuit that switchover switchover is not carried out when the clock to which switchover should be conducted is in an unstable oscillation state. In addition, since switchover signal SEL passes through the shift register, switchover signal SEL becomes immune to noise.

Although the invention has been described with respect to a specific embodiment for a complete and clear disclosures the appended claims are not to be thus limited but are to be construed as embodying all modifications and alternative constructions that may occur to one skilled in the art which fairly fall within the basic teaching herein set forth.

What is claimed is:

1. A clock switchover circuit comprising:
   a first inverter circuit supplied with a clock switchover signal;
   a NAND circuit supplied with a signal output from said first inverter circuit;
   a first flip-flop having a data input terminal, a clock input terminal, a reset terminal, and an output inversion signal terminal, wherein a signal output from said NAND circuit is supplied to said data input terminal, a first clock input signal is supplied to said clock input terminal, and a system reset signal is supplied to said reset terminal;
   a NOR circuit supplied with a signal output from said first inverter circuit;
   a second flip-flop having a data input terminal, a clock input terminal, a reset terminal, and an output inversion signal terminal, wherein a signal output from said NOR circuit is supplied to said data input terminal, a second clock input signal is supplied to said clock input terminal, and the system reset signal is supplied to said reset terminal;
   a second inverter circuit supplied with a signal output from said output inversion signal terminal of said first flip-flop;
   a clock signal selection section supplied with a signal output from said second inverter circuit, the first clock input signal, a signal output from said output inversion signal terminal of said second flip-flop, and the second clock input signal; and
   a third inverter circuit supplied with a signal output from said clock signal selection section, said third inverter circuit outputting a clock signal.

2. The clock switchover circuit according to claim 1, wherein at least one of said first and second flip-flops is a D flip-flop.

3. The clock switchover circuit according to claim 1, wherein at least one of said first and second flip-flops is a master-slave JK flip-flop.

4. A clock switchover circuit comprising:
   a first switch having a power supply potential terminal, a ground potential terminal, and an output terminal, wherein a power supply potential is supplied to said power supply potential terminal, a ground potential is supplied to said ground potential terminal, and said first switch outputs one of the power supply potential and the ground potential through said output terminal based on level of a clock switchover signal;
   a second switch having a first clock input signal terminal, a second clock input signal terminal, and an output terminal, wherein a first clock input signal is supplied to said first clock input signal terminal, a second clock input signal is supplied to said second clock input signal terminal, and said second switch outputs one of the first clock input signal and the second clock input signal through said output terminal based on the level of the clock switchover signal;
   a shift register having a data input terminal, a clock input terminal, a reset terminal, and a data output terminal, wherein a potential output from said output terminal of said first switch is supplied to said data input terminal, a clock input signal output from said output terminal of said second switch is supplied to said clock input terminal, a system reset signal is supplied to said reset terminal, and said shift register shifts the level and outputs the level shifted from said data output terminal; and
   a switchover section having first, second, third, and fourth input terminals and an output terminal, wherein a signal output from said shift register is supplied to said first input terminal, the first clock input signal is supplied to said second input terminal, the second clock input signal is supplied to said third input terminal, the system reset signal is supplied to said fourth input terminal, and said switchover section outputs a clock signal through said output terminal.

5. The clock switchover circuit according to claim 4, wherein said shift register is an exclusive OR circuit.

* * * * *